US00RE36779E

United States Patent [19]

Takizawa et al.

[11] E Patent Number: Re. 36,779

[45] Reissued Date of Patent: Jul. 18, 2000

[54] MOLDED SURFACE FASTENER

[75] Inventors: Toshiaki Takizawa; Ryuichi Murasaki, both of Toyama-ken, Japan

[73] Assignee: YKK Corporation, Tokyo, Japan

[21] Appl. No.: 09/120,344

[22] Filed: Jul. 22, 1998

Related U.S. Patent Documents

Reissue of:

[64] Patent No.: 5,537,720
Issued: Jul. 23, 1996
Appl. No.: 08/519,401
Filed: Aug. 25, 1995

[30] Foreign Application Priority Data

Aug. 26, 1994 [JP] Japan ..... 6-202261

[51] Int. Cl.[7] ..... A44B 18/00

[52] U.S. Cl. ..... 24/452; 24/442

[58] Field of Search ..... 24/450, 442, 452, 24/449, 304, 451, 448, 447, 444, 445, 306

[56] References Cited

U.S. PATENT DOCUMENTS

| | | | |
|---|---|---|---|
| 2,197,968 | 4/1940 | De Mattia . | |
| 3,086,529 | 4/1963 | Munz et al. . | |
| 3,113,803 | 12/1963 | Struble et al. . | |
| 3,134,152 | 5/1964 | Ping . | |
| 3,141,461 | 7/1964 | Farris . | |
| 3,261,069 | 7/1966 | Mathison . | |
| 3,266,113 | 8/1966 | Flanagan . | |
| 3,408,705 | 11/1968 | Kayser et al. . | |
| 3,423,764 | 1/1969 | Cassling . | |
| 3,967,622 | 7/1976 | Cepuritis . | |
| 4,144,887 | 3/1979 | Milnamow . | |
| 4,259,957 | 4/1981 | Sonenstein et al. . | |
| 4,470,794 | 9/1984 | Moertel . | |
| 4,894,060 | 1/1990 | Nestegard . | |
| 4,895,569 | 1/1990 | Wilson et al. . | |
| 4,984,339 | 1/1991 | Provost et al. . | |
| 5,067,210 | 11/1991 | Kayaski . | |
| 5,131,119 | 7/1992 | Murasaki et al. . | |
| 5,230,851 | 7/1993 | Thomas . | |
| 5,339,499 | 8/1994 | Kennedy et al. . | |
| 5,361,462 | 11/1994 | Murasaki | 24/442 |
| 5,457,856 | 10/1995 | Murasaki | 24/452 |
| 5,685,050 | 11/1997 | Murasaki | 24/452 |
| 5,692,271 | 12/1997 | Provost et al. . | |

FOREIGN PATENT DOCUMENTS

| | | |
|---|---|---|
| 0 567 103 A1 | 10/1993 | European Pat. Off. . |
| 2 129 663 | 10/1972 | France . |
| WO 96/27307 | 9/1996 | WIPO . |

OTHER PUBLICATIONS

Velcro Drawing HTH20 Three figs. no date is given, no specification, abstract or claims.

*Primary Examiner*—Victor N. Sakran
*Attorney, Agent, or Firm*—Hill & Simpson

[57] ABSTRACT

A molded surface fastener comprises a substrate sheet and a multiplicity of engaging elements molded in rows on one surface of the substrate sheet. Each of the engaging elements has a stem standing from the one surface of the substrate sheet, and a pair of hooks extending in opposite directions from a distal end of the stem. And a multiplicity of parting guide members stand from the one surface of the substrate sheet, each of which is situated centrally between adjacent engaging elements for parting loops of a companion surface fastener toward the engaging elements.

12 Claims, 5 Drawing Sheets

MOLDED SURFACE FASTENER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a molded synthetic resin surface fastener in which a substrate sheet and a multiplicity of engaging elements projecting from one surface of the substrate sheet are formed integrally with each other, and more particularly to a molded surface fastener which has adequate engaging strength and rate suitable for use in a joint of industrial materials, such as ceiling materials and wall materials which are subject to peeling forces and which has adequate durability without giving damage to engaging elements of the companion surface fastener during peeling.

2. Description of the Related Art

Molded surface fasteners of the described type have greater engaging strength compared to the ordinary knitted or woven surface fasteners and are therefore widely used in joining interior ornamental materials, such as wall materials and ceiling materials. Generally, the individual engaging element of the molded surface fastener has a stem standing from one surface of a substrate sheet, and a hook curving in one direction from the distal end of the stem and terminating in an end directed to the surface of the substrate sheet.

In the case that the individual engaging element of the molded surface fastener is a hooked member having the above-mentioned simple hook structure, in order to increase the degree of strength of engagement with a looped member, which is the companion engaging element, it has been customary to mold the engaging elements of rigid synthetic resin or to increase the thickness of the looped member. However, the rigid engaging element will give an undesirable touch, and it tends to be out of engagement of the companion looped member. In the case of the thick looped member, the surface fastener not only would become rigid but also would have less engaging elements per unit area on the substrate sheet, thus making it difficult to secure a predetermined degree of engaging strength.

Consequently, soft synthetic resin materials, such as polyester, polyamide and polyurethane, usually suitable for molded surface fasteners are used, and at the same time, various forms of engaging elements are put into practice in order to secure the relative strength of hooked and looped members and in order to increase the engaging strength. A typical form of engaging element, as disclosed in, for example, Japanese Patent Laid-Open Publications Nos. SHO 47-31740 and HEI 4-224703, has front and rear engaging portions symmetrically projecting from the distal end of a generally trapezoidal hook. An alternative form, as disclosed in, for example, Japanese Utility Model Laid-Open Publication No. HEI 4-128611, has the distal end of a stem being branched and one of the branched end is made to have a hook shape. According to these known forms, the number of engaging elements per unit area on the substrate sheet increases to increase the rate of engagement with companion engaging elements so that the engaging strength of the entire surface fastener is increased.

In the molded surface fastener to be used in the industrial materials, a predetermined space must be provided between each adjacent pair of engaging elements due to the mold technology. Consequently the density of engaging elements on the substrate sheet surface is necessarily limited to a considerably low degree compared to the density of looped members of the companion surface fastener. Even if an attempt is made to increase the rate of engagement by providing each engaging element with hooks facing in opposite directions as disclosed in the above-mentioned publications, the rate of engagement has a limit as the number of looped members actually engaged with the engaging elements of the molded surface fastener is several tens percent of the total number of looped members.

In an attempt to increase the rate of engagement of hooks with looped members entering between front and rear engaging elements adjacent to each other in the same rows, the engaging element disclosed in, for example, European Pat. No. 0464753A1 has a rear rising surface in a position on the substrate sheet surface at which position a perpendicular line passing through the end of the hook of the rear next engaging element meets the substrate sheet surface. According to this arrangement, if the looped member is raised along the rear surface of the front next engaging element, there is no guarantee that the looped member may come into engagement with the hook of the rear next engaging element. Further, with this type conventional molded surface fastener, most of the looped members entered between every adjacent pair of rows of hooks remain unengaged with the hooks.

SUMMARY OF THE INVENTION

It is therefore an object of this invention to provide a molded surface fastener which has engaging elements each in a rational form to improve the rate of engagement with loops and to secure a much higher increased degree of peeling strength and in which a substrate sheet can be prevented from being torn between the engaging elements.

According to this invention, the above object is accomplished by a molded surface fastener comprising a substrate sheet and a multiplicity of engaging elements molded in rows on one surface of the substrate sheet. Each of the engaging elements has a stem standing from the one surface of the substrate sheet, and hooks extending from a distal end of the stem. A multiplicity of parting guide members, *or protrusions* stand from the one surface of the substrate sheet, each of the parting guide members being situated centrally between adjacent engaging elements for parting loops of a companion surface fastener toward the engaging elements.

Preferably, each of the engaging element has a pair of the hooks extending in opposite directions and being formed in a front-rear symmetry in a plane perpendicular to the general plane of the substrate sheet and including the center line of the stem. Alternatively, the pair of hooks is formed in a pair of parallel planes perpendicular to the general plane of the substrate sheet on opposite sides of the central line of the stem. Further, each of the parting guide members has front and rear or right and left guide surfaces gently curving from its upper end to its lower end to diverge. In an alternative form, each of the parting guide members has on its top one or more hooks extending in a direction of row of the engaging elements. The one or more hooks extend in a forward or rearward direction or both directions.

Further preferably, the parting guide members are disposed between adjacent rows of the engaging elements. Alternatively, each of the parting guide members is disposed between a pair of the engaging elements in the same row.

In operation, since each of the loops entering at random between the front and rear engaging elements are parted by the parting guide member so as to come close to the front or rear engaging element, it is possible to secure a reliable engagement of the loops with the engaging elements so that the rate of engagement is increased to obtain a desired engaging force. Further, contrary to the conventional surface fasteners which are easy to be torn between rows of the engaging elements, it is possible to effectively prevent the substrate sheet from being torn since the parting guide members are integrally formed on the substrate sheet between rows of the engaging elements or between the front and rear engaging elements.

In case the parting guide member has a hook, the loop entering in front of the hook of the parting guide member is caught by the hook. And as the parting guide member has on opposite sides slopes, the loops entering opposite sides of the hook of the parting guide member are parted diagonally toward the adjacent engaging elements.

In case that the engaging element is in a form of two adjacent conventional hook elements being joined integrally with each other and having hooks facing in the opposite directions, the thickness of the stem of the engaging element of this invention is substantially double the thickness of the conventional hooked members. When a peeling force is exerted on the engaging element with both the front and rear hooks in engagement with the loops, the stem is scarcely subject to bend due to the peeling force while the individual hooks are angularly moved about their bases in a horizontal plane independently without interfering with each other and, at the same time, the upper portion of the hook resiliently deforms in the rising direction. Therefore the loops can be easily removed off the hooks without giving any damage to each other.

DETAILED DESCRIPTION OF THE PREFERRED EMBODIMENTS

Typical embodiments of this invention will now be described in detail with reference to the accompanying drawings.

Figure 1:
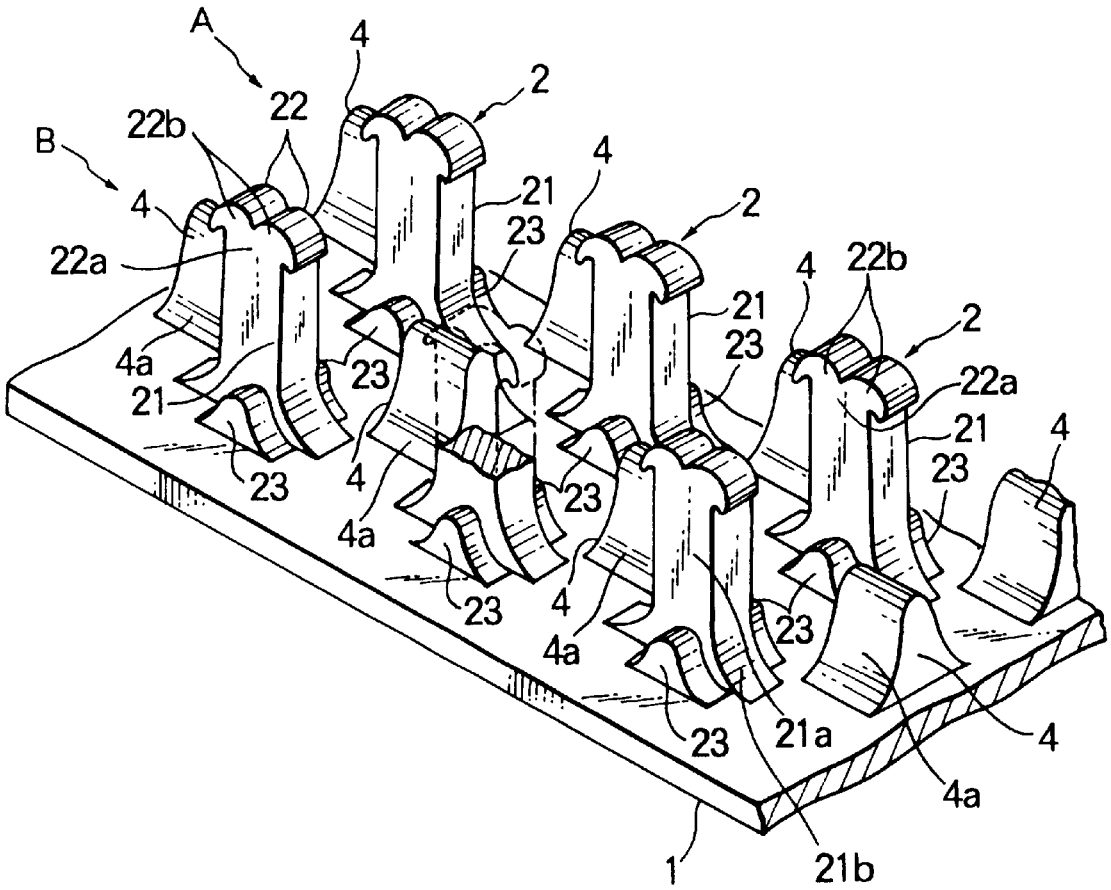
FIG. 1 is a fragmentary perspective view of a molded surface fastener according to a typical embodiment of this invention.

FIG. 1 is a fragmentary perspective view of a molded surface fastener according to a first embodiment of the invention. According to the first embodiment, a multiplicity of engaging elements 2 are integrally molded on a top surface of a substrate sheet 1. Each of the engaging elements 2 is composed of a stem 21 standing from the top surface of the substrate 1, and front and rear hooks 22, 22 branched in opposite directions from the upper end of the stem 21 and each extending diagonally upwardly with a predetermined curvature and terminating in a downwardly directed end. The stem 21 has a body 21a having a rectangular cross section, and a base end 21b diverging toward the top surface of the substrate sheet 1 with smooth front and rear curved surfaces symmetrical with respect to the vertical center line of the stem body 21a. On each of opposite sides of the base end 21b of the stem 21, a reinforcing rib 23 having a mount-shape in vertical cross section is formed integrally of the stem 21 and has front and rear smooth curved surfaces extending from its top toward the top surface of the substrate sheet 1. The opposite reinforcing ribs 23, 23 serve to prevent the stem 21, which has a relatively small width, from falling or bending sideways.

Figure 3:
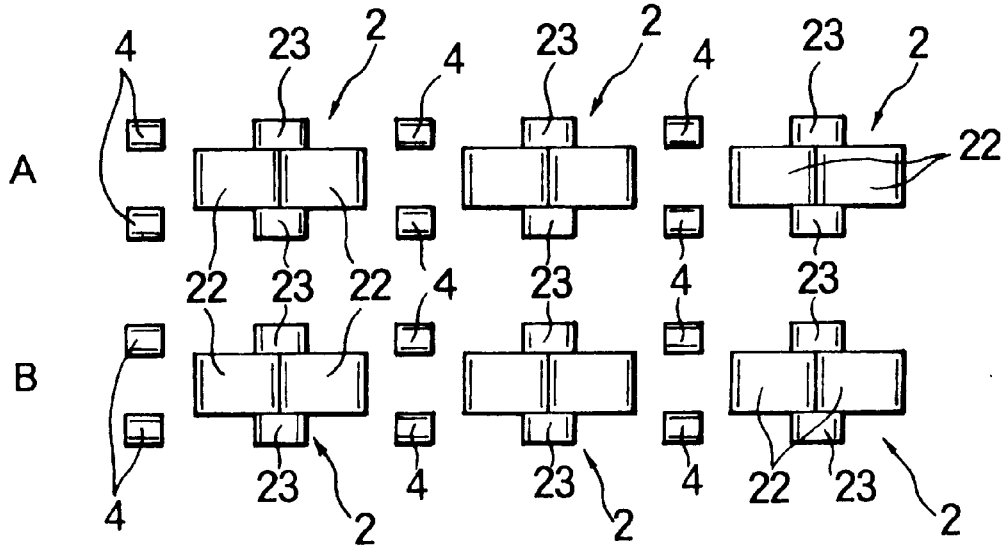
FIG. 3 is a schematic top view of the molded surface fastener of FIG. 1, showing another example of arrangement of parting guide members.
Figure 4:
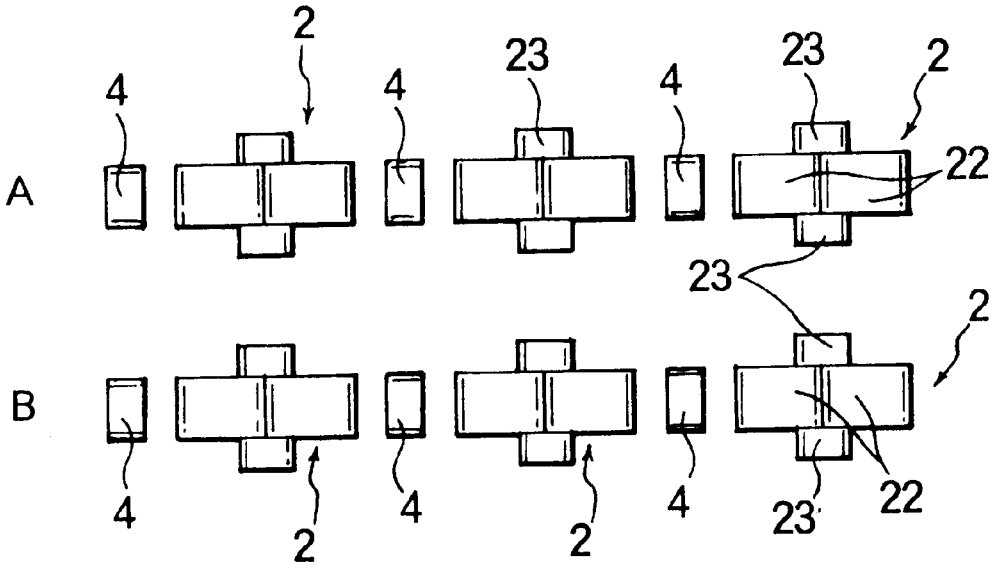
FIG. 4 is a view similar to FIG. 3, showing still another example of arrangement of parting guide members.

A multiplicity of the engaging elements 2 of the above described form are arranged in matrix in a predetermined pitch in the front-rear direction (row) and at a predetermined distance in the right-left direction (column). In the illustrated example, a loop parting guide member, *or protrusion* 4, which is the most characteristic feature of this invention, is formed integrally on the top surface of the substrate sheet 1 at a central position among four adjacent engaging elements 2. The arrangement of the parting guide members 4 should by no means be limited to that of FIG. 1; for example, they may be arranged in a manner that one is disposed centrally between each pair of the adjacent front and rear reinforcing ribs 23, 23 as shown in FIG. 3, or they may be arranged in a manner that one is disposed centrally between each pair of the adjacent front and rear engaging elements 2, 2 as shown in FIG. 4.

As long as it has a form such as to part loops 3 coming from the above toward the hooks 22 of the front and rear and right and left engaging elements 2, the parting guide member 4 may be in any of various forms. Generally it is preferable that the parting guide member 4 stands from the top surface of the substrate sheet 1 and has front and rear side slopes each facing the respective hook 22. The directions of the front and rear side slopes are essentially such that the loops 3 are parted to come close to the respective hooks 22 of the front and rear or right and left adjacent engaging elements 2.

In the example of FIG. 1, the parting guide member 4 has a mount shape in vertical cross section with opposite side surfaces being flat. Preferably the slopes 4a define such a parting surface as to part the loops 3, which enter centrally between the right and left adjacent engaging element rows A, B, toward the space between the front and rear engaging elements 2, 2 of the respective row. In the arrangement of the parting guide members 4 of FIGS. 3 and 4, the slopes 4a are determined to face the front and rear engaging elements 2, 2, respectively, to bring the loops 3, which enter centrally between the front and rear engaging elements 2, 2 in the same row, close to one of the hooks 22, 22 of the front and rear engaging elements 2. The height of the parting guide member 4 may be determined arbitrarily; however, if it exceeds the height of the stem body 21a of the engaging element 2, not only the loops are difficult to come into engagement with the hooks 22, but also the resulting surface fastener tends to loose flexibility. And if the height of the parting guide member 4 is less than that of the base end 21b, the parting guide member 4 does not perform the original parting function. It is accordingly preferable that the parting guide member 4 has a height between them.

Figure 2:
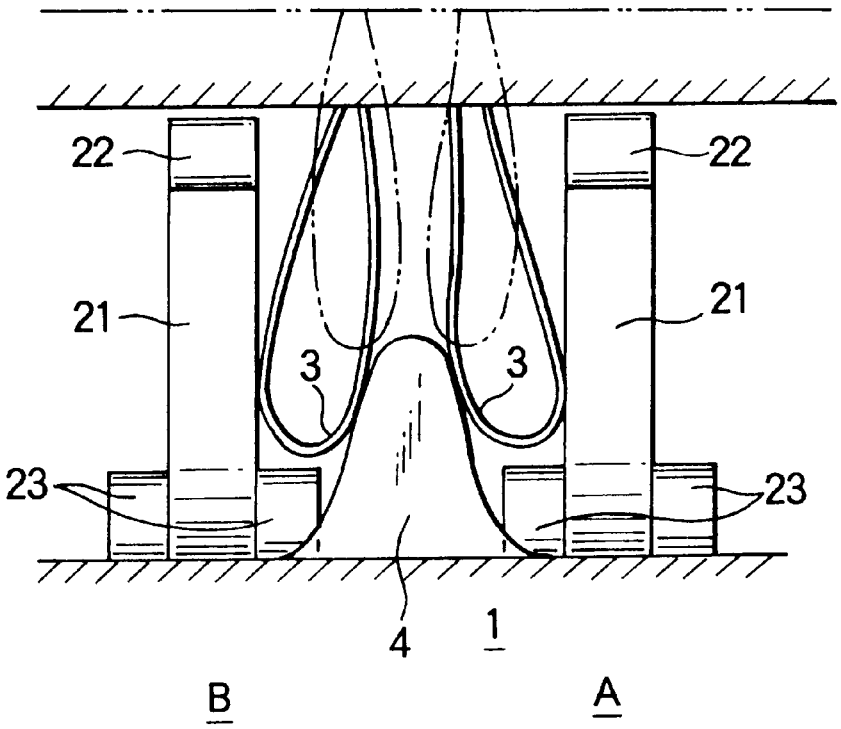
FIG. 2 is a fragmentary front view of the molded surface fastener of FIG. 1, showing the action of loops of a companion surface fastener when the latter is joined with the molded surface fastener.

According to the molded surface fastener of the first embodiment, since the loops 3 entering at random between a multiplicity of the engaging elements 2 are parted toward the adjacent engaging elements 2 by the parting guide member 4 as shown in FIG. 2, the loopes 3 entering between the engaging element rows A, B are parted toward any of the right and left engaging element rows A, B to increase the rate of catching the loops 3 by the engaging elements 2, thus increasing the rate of engagement remarkably to obtain a predetermined engaging force. Further, contrary to the conventional surface fasteners which are easy to be torn between rows of the engaging elements, it is possible to prevent the molded surface fastener from being torn during the ejecting of the molded surface fastener from the mold or during the sewing of the molded surface fastener or in use since the parting guide members 4 are integrally formed on the substrate sheet 1 at positions between the engaging element rows and between the front and rear engaging elements 2.

Figure 5:
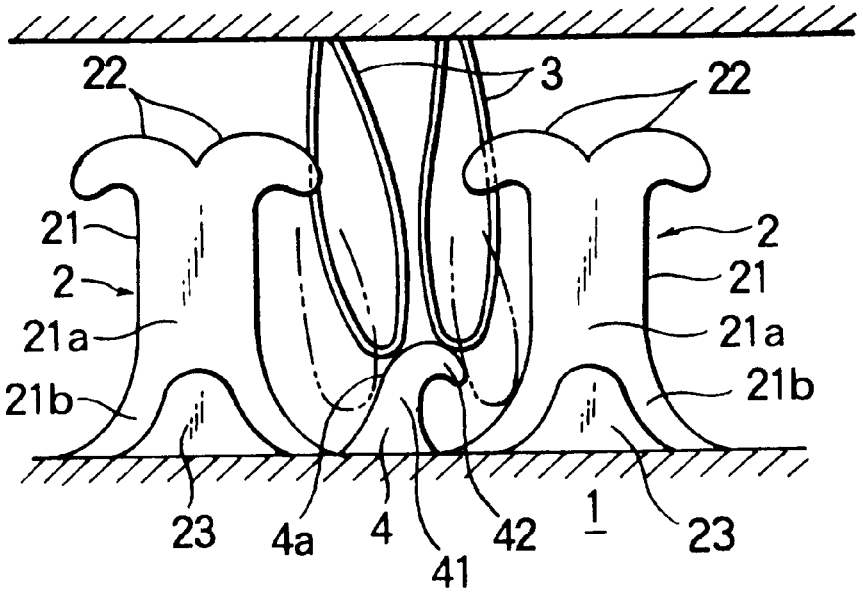
FIG. 5 is a fragmentary side view showing a modified form of the parting guide members.

FIG. 5 shows a modified parting guide member 4 which serves not only to part loops 3 toward a number of adjacent engaging elements 2 but also to catch the loops 3 by itself. Specifically, the modified parting guide member 4 has a stem 41 standing from the top surface of the substrate sheet 1, and a hook 42 extending in one direction from the upper end of the auxiliary stem 41. The auxiliary stem 41 has a generally frustoconical contour diverging toward and tapering away from the top surface of the substrate sheet 1. Therefore, the loop 3 coming to the front side of the hook 42 is caught by the hook 42 while the loops 3 coming to the right and left sides of the hook 42 are parted diagonally to the right and left between the adjacent engaging elements 22. The contour of the stem 41 and the direction of the hook 42 should not be limited to the illustrated example and may be determined arbitrarily.

Figure 6:
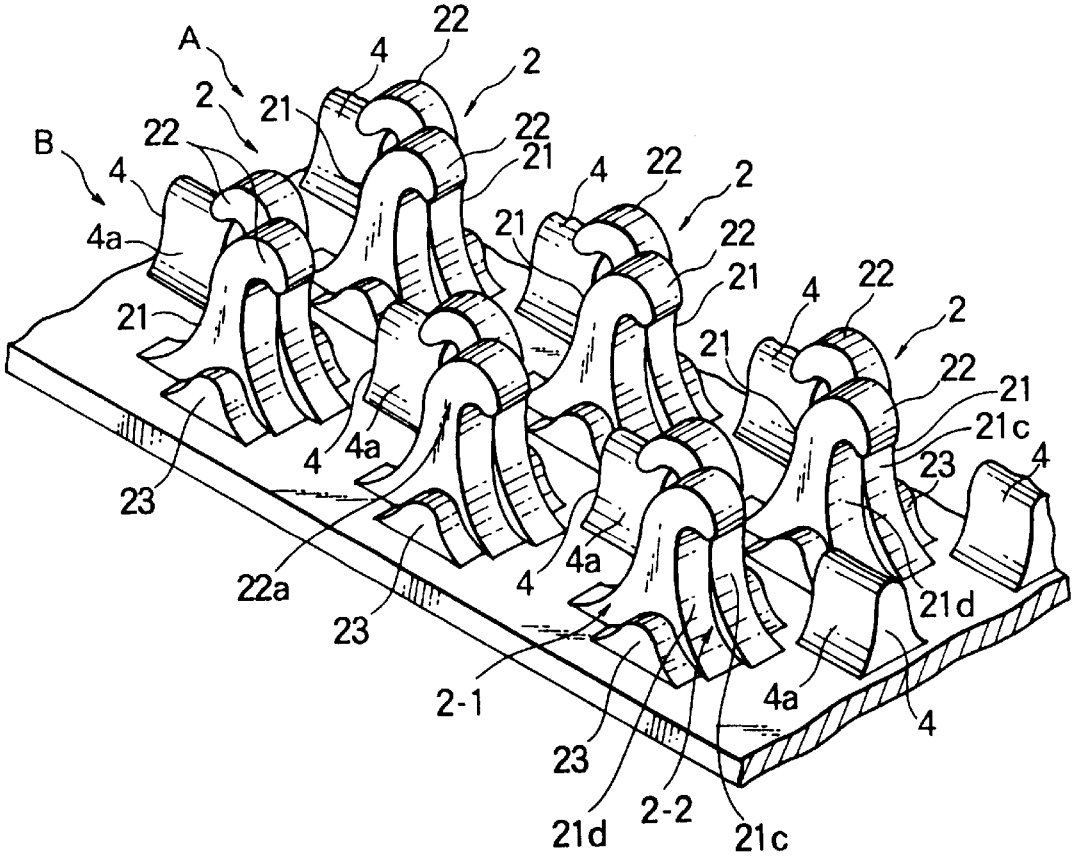
FIG. 6 is a fragmentary perspective view of a molded surface fastener according to another typical embodiment of the invention.

FIG. 6 shows a molded surface fastener according to another typical embodiment of the invention, in which the form of each engaging element 2 is different from that of the foregoing embodiment. In this embodiment, a multiplicity of engaging elements 2 integrally molded on and projecting from the top surface of a substrate sheet 1 are formed with pairs of engaging members as disclosed in, for example, U.S. Pat. No. 4,984,339, and in each of which the pair of engaging members are arranged next to each other with their hooks directed in opposite directions, closely resembling a form in which the engaging members are integrally joined together at their side surfaces.

In the second embodiment, the engaging element 2 is composed of a pair of members 2-1, 2-2. Each member 2-1, 2-2 comprises a stem portions 21-1, 21-2 each having a rear surface 21c rising along a gentle curve from the upper surface of the substrate sheet 1 and a front surface 21d rising initially in a predetermined curvature and then perpendicularly from the upper surface of the substrate sheet 1 and composing a stem 21, and a hook 22 extending from the stem 21 and terminating in a downwardly directed end. The two engaging members 2-1, 2-2 are integrally joined partly at their respective hooks 22, 22 and at their respective stem portions 21-1, 21-2, as indicated by diagonal dotted lines in FIG. 7, with the hooks 22, 22 extending from the respective stem portions 21-1, 21-2 in opposite directions. In the illustrated example, each stem 21 has on its lower outside surfaces reinforcing ribs 23. A multiplicity of such engaging elements 2 are formed on the upper surface of the substrate sheet 1 with the front and rear hooks 22, 22 of the individual engaging elements 2 arranged in straight rows.

Figure 7:
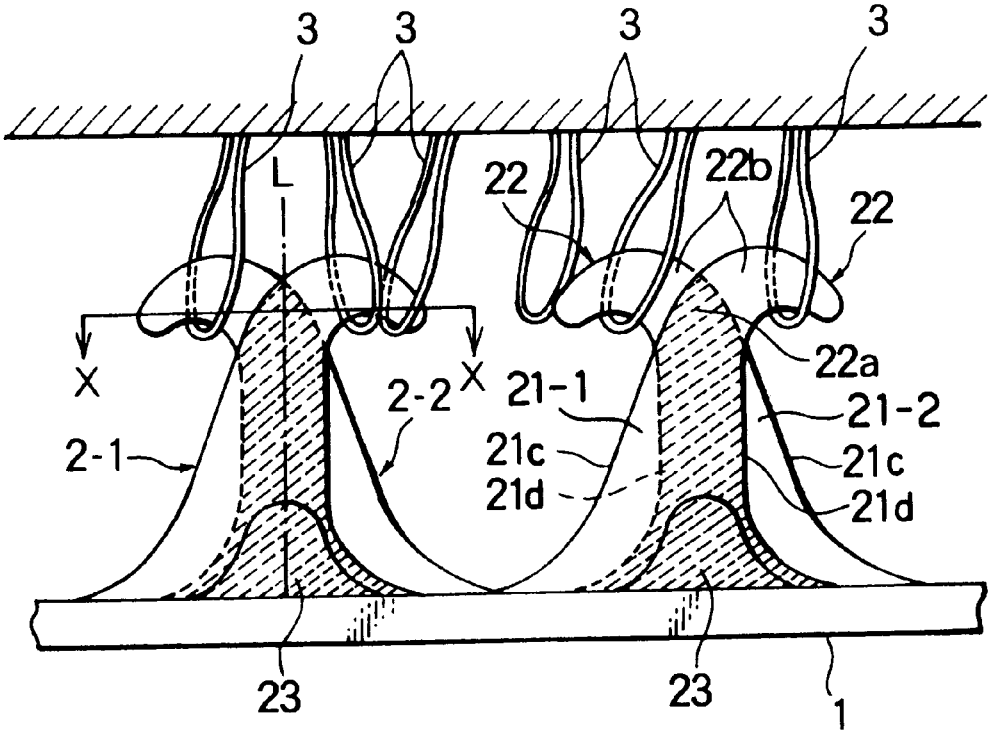
FIG. 7 is a fragmentary front view of the molded surface fastener of FIG. 6, showing the action of loops of a companion surface fastener when the latter is joined with the molded surface fastener.
Figure 8:
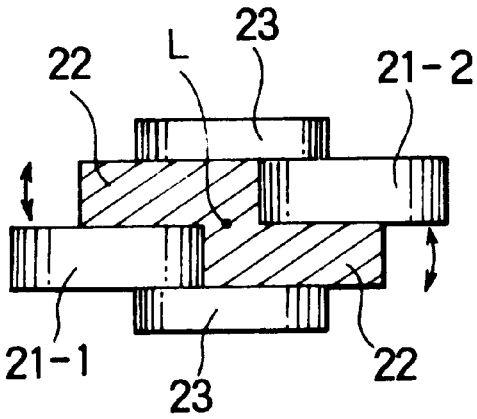
FIG. 8 is a cross-sectional view taken along line X—X of FIG. 7, schematically showing the action of the engaging element when the molded surface fastener is peeled off a companion surface fastener.

FIG. 7 shows the normal manner in which companion loops 3 are in engagement with the engaging elements 2 formed on the substrate sheet 1. FIG. 8 is a cross-sectional view taken along line X—X of FIG. 7, showing the action of the engaging element 2, when an upward peeling force is exerted on the surface fastener, in the case that two loops 3, 3 are in engagement with the front and rear hooks 22, 22, respectively. In this case, the front and rear hooks 22, 22 tend to engage the loops 3 not right above the respective hooks, but the front and/or rear hooks 22, 22 tend to engage the loops 3 off the positions right above the respective hooks.

In the conventional engaging element disclosed in the above-mentioned publications, assuming that its engaging force is equal to that of the engaging element of this invention, the stem of the conventional engaging element has a thickness about a half of the stem 21 of this invention and therefore tends to receive the great influence of the peeling force. For example, if two loops act on the engaging element in a common direction, the stem tends to bend together with the hooks so that the loops can hardly be disengaged from the hooks.

According to the engaging element structure of this invention, partly since the stem 21 has a great thickness and partly since the front and rear hooks 22, 22 are integrally joined at their bases 22a, 22a, when the two loops 3, 3 are in engagement with the front and rear hooks 22, 22 respectively, the stem 21 and the base 22a of the hook 22 do not tend to bend due to an upward peeling force. In the meantime, the front and rear hooks 22, 22 deform so as to angularly move about their bases 22a in a horizontal plane independently without interfering with each other, and the upper portions 22b, 22b of the respective hooks 22, 22 deform in the rising direction. As a result, the loops 3, 3 tend to be disengaged from the hooks 22, 22 without any damage.

As the foregoing function demonstrates not only when a single loop 3 is in engagement with only one of the front and rear hooks 22 of the engaging element 2 but also when the loop 3 is in hanging engagement with the engaging element 2, the loops 3, 3 can be disengaged from the hooks 22, 22 easily without giving any damage to one another.

Also in the second embodiment of FIG. 6, a multiplicity of parting guide members 4 each having the same contour as that of FIG. 1 stand from the top surface of the substrate sheet 1. Because of the parting guide members 4, it is possible to increase the rate of engagement of the engaging elements 2 with the loops 3 and to minimize damage that might be given to the engaging elements 2 and the loops 3 during peeling, thus securing a desired engaging force.

As is apparent from the foregoing description, various modifications may be suggested. For example, in the embodiment of FIG. 6, it is possible to further increase the rate of engagement of the engaging elements with the loops by making the front and rear hooks 22, 22 different in height from one another.

According to the molded surface fastener of this invention, since the parting guide members 4 for loops 3 of a companion surface fastener stand from the top surface of the substrate sheet 1 at predetermined positions between a multiplicity of engaging elements 2 each having a set of front and rear hooks 22, 22, it is possible to part loops 3, which come from various directions, toward any of adjacent engaging elements 2 reliably so that the rate of catching the loops 3 by the engaging elements 2 increases. As a result, the rate of engagement is increased so that the surface fastener can demonstrate a desired engaging force. Because of the parting guide members 4, it is possible to avoid any break or tear between engaging element rows and between front and rear engaging elements 2, which portions can be most easily broken or torn.

In this invention, in the case that each engaging element is composed of the pair of engaging element having the pair of hooks 22 extending in opposite directions from the upper end of the respective stem portions 21-1, 21-2 with a part where they are in contact with each other being joined integrally, the individual book 22 deforms upwardly moving in a horizontal plane about the center line of the stem 21, with no undue force on the hooks 22 and loops 3 and hence no damage thereto, and is disengaged from the loops 3 smoothly during the peeling. The molded surface fastener of this invention is therefore particularly useful when used in joining industrial materials, such as wall and ceiling materials, because damage can hardly be caused to the engaging elements at the time of disengagement.

What is claimed is:

1. A molded surface fastener, comprising:

(a) a substrate sheet;

(b) a multiplicity of engaging elements molded in rows on one surface of said substrate sheet, each of said engaging elements having a stem standing from said one surface of said substrate sheet[,] and [hooks] *at least one hook* extending from a distal end of said stem; and (c) a multiplicity of parting guide members standing from said one surface of said substrate sheet, each of said parting guide members being situated centrally between adjacent said engaging elements for parting loops of a companion surface fastener toward said engaging elements.

2. A molded surface fastener according to claim 1, wherein each of said engaging element has a pair of said hooks extending in opposite directions and being formed in a front-rear symmetry in a plane perpendicular to the general plane of said substrate sheet and including the center line of said stem.

3. A molded surface fastener according to claim 1, wherein each of said engaging element has a pair of said hooks extending in opposite directions and being formed in a pair of parallel planes perpendicular to the general plane of said substrate sheet on opposite sides of the central line of said stem.

4. A molded surface fastener according to claim 1, wherein each of said parting guide members has front and rear or right and left guide surfaces gently curving from its upper end to diverge to its lower end.

5. A molded surface fastener according to claim 1, wherein each of said parting guide members has on its top one or more hooks extending in a direction of row of said engaging elements.

6. A molded surface fastener according to claim 1, wherein said parting guide members are disposed between adjacent rows of said engaging elements.

7. A molded surface fastener according to claim 1, wherein each of said parting guide members is disposed between a pair of said engaging elements in the same row.

*8. A molded surface fastener, comprising:*

*a substrate sheet;*

*a multiplicity of engaging elements molded in rows on one surface of said substrate sheet, and at least one hook extending from a distal end of said stem; and*

*a multiplicity of protrusions extending upwardly from said one surface of said substrate sheet, each of said protrusions being situated centrally between adjacent elements in a hook extending direction, and having a height less than a height of a distal end of said hook above said one surface.*

*9. A molded surface fastener according to claim 8, wherein each of said protrusions has guide surfaces on opposing sides which decline outwardly From a distal end of said each protrusions to a base end thereof.*

*10. A molded surface fastener according to claim 9, wherein said guide surfaces are gently curving.*

*11. A molded surface fastener according to claim 10, wherein said guide surfaces are curved convexly at said distal end of said protrusion and concavely at said base end of said each protrusion.*

*12. A molded surface fastener according to claim 9, wherein each of said guide surfaces face the hook of the nearest said adjacent element respectively.*

* * * * *